United States Patent [19]

Kaeding et al.

[11] 3,911,041

[45] Oct. 7, 1975

[54] CONVERSION OF METHANOL AND DIMETHYL ETHER

[75] Inventors: Warren W. Kaeding, Westfield; Stephen A. Butter, East Windsor, both of N.J.

[73] Assignee: Mobil Oil Corporation, New York, N.Y.

[22] Filed: Sept. 23, 1974

[21] Appl. No.: 508,307

[52] U.S. Cl. ............ 260/682; 252/437; 260/668 R; 260/676 R
[51] Int. Cl.² .......................................... C07C 1/20
[58] Field of Search .................... 260/682, 668 R

[56] References Cited
UNITED STATES PATENTS

| | | | |
|---|---|---|---|
| 1,914,722 | 6/1933 | Jaeger | 260/682 |
| 2,950,332 | 8/1960 | Mattox | 260/668 |
| 3,529,033 | 9/1970 | Frilette et al. | 260/682 |
| 3,791,964 | 2/1974 | Kuehl | 252/437 |
| 3,846,337 | 11/1974 | Young | 252/437 |

*Primary Examiner*—Paul M. Coughlan, Jr.
*Attorney, Agent, or Firm*—Charles A. Huggett; Vincent J. Frilette

[57] ABSTRACT

Methanol and dimethyl ether are converted to a reaction product containing olefins. The conversion is carried out employing a catalyst comprising a crystalline aluminosilicate zeolite having a silica to alumina ratio of at least about 12, a constraint index of about 1 to 12, and containing phosphorus incorporated with the crystal structure thereof in an amount of at least about 0.78 percent by weight.

20 Claims, No Drawings

CONVERSION OF METHANOL AND DIMETHYL ETHER

BACKGROUND OF THE INVENTION

1. Field of the Invention

This invention relates to the conversion of methanol and dimethyl ether to obtain a reaction product containing olefins.

2. Description of the Prior Art

U.S. Pat. No. 3,702,886, issued Nov. 14, 1972, to Argauer et al., discloses ZSM-5 zeolite catalyst.

U.S. Pat. No. 3,709,979, issued Jan. 9, 1971, to Chu, discloses ZSM-11 zeolite catalyst.

West German Offenlagunschrifft 2,213,109, published Sept. 21, 1972, to Mobil Oil Corporation, discloses ZSM-12 zeolite catalyst.

Copending application Ser. No. 358,192, filed May 7, 1973, now abandoned, discloses ZSM-21 zeolite catalyst.

Copending application Ser. No. 130,442, filed Apr. 11, 1971, now abandoned, discloses TEA mordenite.

Copending application Ser. No. 508,308, filed Sept. 23, 1974, (attorney's docket number Case 8487) discloses a catalyst comprising a crystalline aluminosilicate zeolite having a silica to alumina ratio of at least about 12, a constraint index of about 1 to 12, and containing phosphorus incorporaed with the crystal structure thereof in an amount of at least about 0.78 percent by weight and discloses the conversion of aliphatic compounds, particularly hydrocarbons, both paraffins and olefins, by contact with the catalyst.

Copending application Ser. No. 508,306, filed Sept. 23, 1974, (attorney's docket number Case 8489) discloses a process for the alkylation of olefins employing, as a catalyst, a crystalline aluminosilicate zeolite having a silica to alumina ratio of at least about 12, a constraint index of about 1 to 12, and containing phosphorus incorporated with the crystal structure thereof in an amount of at least about 0.78 percent by weight.

Copending appliccations Ser. Nos. 387,222; 387,223; and 387,224, filed Aug. 9, 1973, disclose the conversion of alcohols or ethers or carbonyls to higher carbon number hydrocarbons by contact with a catalyst comprising a crystalline aluminosilicate zeolite having a silica to alumina ratio of at least about 12 and a constraint index of about 1 to 12.

SUMMARY OF THE INVENTION

In accordance with the invention, methanol or dimethyl ether is subjected to the action, at a temperature of at least about 300° C, with a catalyst comprising a crystalline aluminosilicate zeolite having a silica to alumina ratio of at least about 12, a constraint index of about 1 to 12, and containing phosphorus incorporated with the crystal structure thereof in an amount of at least about 0.78 percent by weight. The amount of the phosphorus incorporated with the crystal structure of the zeolite may be as high as about 4.5 percent by weight. The zeolite, preferably, also has a dried crystal density of not less than about 1.6 grams per cubic centimeter. The reaction may be carried out employing the catalyst modified by impregnating with zinc.

DESCRIPTION OF THE PREFERRED EMBODIMENTS

The methanol or dimethyl ether is contacted with the catalyst at a temperature of about 300° to 700° C. Preferably, the temperature is at least about 350° C. As the temperature is increased above about 300° C, the conversion of the methanol or dimethyl ether is increased. By "conversion" we mean the weight percent of the methanol or dimethyl ether that reacts in the presence of the catalyst and forms other compounds. However, as the temperature approaches about 700° C, the selectivity to olefins decreases. By 37 selectivity" we mean the weight percent of the converted methanol or dimethyl ether that is olefins. Temperatures greater than about 750°C should not be employed because of deleterious effect on the catalyst, the olefin products, or both.

Methanol alone or dimethyl ether alone may be contacted with the catalyst. However, a mixed feed of methanol and dimethyl ether may also be employed. It is believed that, where methanol is employed as the reactant, either alone or in a mixed feed with dimethyl ether, the methanol reacts in the presence of the catalyst to form first dimethyl ether and the products formed thereafter are those resulting from reaction of the dimethyl ether in the presence of the catalyst. Further, the products obtained result solely from reaction of the methanol or the dimethyl ether each with itself and the presence of a co-reactant with the methanol or dimethyl ether is not required.

The reaction of the methanol or the dimethyl ether is preferably carried out in the vapor phase.

Fixed bed or movable bed operation may be employed. Preferably, a fixed bed operation is employed. The methanol or dimethyl ether may be passed over a bed of the catalyst at rates of about 1.5 to 14.5 unit weights of reactant per hour per unit weight of catalyst, i.e., at weight per hour space velocities (WHSV) of about 1.5 to 14.5. Lower weight per hour space velocities can, of course, be employed. With any temperature of conversion, a greater degree of conversion is obtained with lower space velocities.

The essence of the invention is the use of the catalyst comprising the crystalline aluminosilicate zeolite having a silica to alumina ratio of at least about 12, a constraint index of about 1 to 12, and containing phosphorus incorporated with the crystal structure thereof in an amount of at least about 0.78 percent by weight. This catalyst employed in the present invention is disclosed in copending application Ser. No. 508,308, filed Sept. 23, 1974, (attorney's docket number Case 8487) and the entire disclosure of the copending application is incorporated herein by reference.

A group of crystalline aluminosilicate zeolites having a silica to alumina ratio of at least about 12 and a constraint index of about 1 to 12 has recently been discovered to have some very unusual catalytic properties. They induce profound transformations of aliphatic hydrocarbons to aromatic hydrocarbons in commercially desirable yields. Further, although they have unusually low alumina contents, i.e., high silica to alumina ratios, they are active even when the silica to alumina ratio exceeds 30. This activity is considered to be surprising since the alumina in the zeolite framework is believed responsible for catalytic activity. They retain their crystallinity for long periods in spite of the presence of steam at high temperature which induces irreversible collapse of the framework of other zeolites, e.g., of the X and A type. Furthermore, carbonaceous deposits, when formed, may be removed by burning at higher than usual temperatures to restore activity.

An important characteristic of the crystal structure of these zeolites is that it provides constrained access to, and egress from, the interacrystalline free space by virtue of having a pore dimension greater than about 5 Angstroms and pore windows of about a size such as would be provided by ten-numbered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the center of the tetrahedra. Breifly, the zeolites useful for preparing the phosphorus-containing zeolite employed as catalyst in this invention, hereinafter termed "the phosphorus-containing zeolite", possess, in combination, a silica to alumina ratio of at least about 12 and a structure providing constrained access to the crystalline free space defined in terms of a constraint index of about 1 to 12. Further reference will be made hereinafter to the constraint index.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Althrough zeolites with a silica to alumina ratio of at least about 12 are useful to prepare the phosphorus-containing zeolite employed as catalyst in this invention, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous.

The zeolites useful for preparation of the phosphorus-containing zeolite employed as catalyst in this invention freely sorb normal hexane and have a pore dimension greaer than about 5 Angstroms. In addition, the structure must provide constrained access to larger molecules. It is sometimes possible to judge from a known crystal structure whether such constrained access exists. For example, if the only pore windows in a crystal are formed by eight-membered rings of oxygen atoms, then access to molecules of larger cross-section than normal hexane is excluded and the zeolite is not of the desired type. Windows of ten-membered rings are preferred, although excessive puckering or pore blockage may render these zeolites ineffective. Twelve-membered rings do not generally appear to offer sufficient constraint, although structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° and 950° F to give an overall conversion between 10 percent and 60 percent. The mixture of hydrocarbons is passed at 1 liquid hourly space velocity (i.e., 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for use are those having a constraint index, as mentioned, from about 1 to 12. Preferably, the constraint index is from about 2 to 7.

The zeolites defined herein are exemplified, to the extent that they have a silica to alumina ratio of at least about 12 and a constraint index of about 1 to 12, by ZSM-5, ZSM-11, ZSM-12, ZSM-21, TEA mordenite and other similar materials.

The entire contents of recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft 2,213,109, the entire contents of which are incorporated herein by reference.

ZSM-21 is more particularly described in U.S. application Ser. No. 358,192, filed May 7, 1973, the entire contents of which are incorporated herein by reference.

TEA mordenite is more particularly described in U.S. application Ser. No. 130,442, filed April 11, 1971, the entire contents of which are incorporated herein by reference.

The zeolites, when prepared in the presence of organic cations, are catalytically inactive, possibly because the intracrystalline free space is occupied by organic cations from the forming solution. They may be activated by heating in an inert atmosphere at 500° C for 1 hour, for example, followed by base exchange with ammonium salts followed by calcination at 500° C in air. The presence of organic cations in the forming solution may not be absolutely essential to the formation of the zeolite; however, the presence of these cations does appear to favor the formation of these special zeolites. More generally, it is desirable to activate the zeolite catalyst by base exchange with ammonium salts followed by calcination in air at about 500° C for from about 15 minutes to about 24 hours.

Natural zeolites may sometimes be converted to zeolites suitable for preparing the catalysts for use in the present invention by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred zeolites are ZSM-5, ZSM-11, ZSM-12, ZSM-21, and TEA mordenite, with ZSM-5 particularly preferred.

In a preferred aspect, the zeolites for preparation of the phosphorus-containing zeolite employed as catalyst in this invention are those having a crystal density, in the dry hydrogen form, of not substantially below about 1.6 grams per cubic centimeter. It has been found that zeolites which satisfy all three of these criteria are most desired. Therefore, the preferred phosphorus-containing zeolites are prepared from zeolites having a constraint index as defined above of about 1 to 12, a silica to alumina ratio of at least about 12, and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. This density of not substantially below about 1.6 grams per cubic centimeter of course must be associated with a relatively small amount of free space within the crystal, which might be expected to result in more stable structures. This free space, however, is important as the locus of catalytic activity.

The zeolites whether having phoshorus incorporated therewith or not are capable of having at least a portion of the original cations associated therewith replaced by a wide variety of other cations according to techniques well known in the art. Replacing cations include ammonium and metal cations, including mixtures of the same. The phosphorus-containing zeolite employed as catalyst in this invention is prepared from zeolites wherein at least a portion of the original cations associated therewith have been replaced by hydrogen.

The crystalline aluminosilicate zeolites can be converted to the hydrogen form, i.e., having at least a portion of the original cations associated therewith replaced by hydrogen, generally by two methods. The first involves direct ion exchange employing an acid. Suitable acids include both inorganic acids and organic acids. Typical inorganic acids which can be employed include hydrochloric acid, hypochlorous acid, sulfuric acid, sulfurous acid, hydrosulfuric acid, nitric acid, nitrous acid, hyponitrous acid, phosphoric acid, and carbonic acid. Typical organic acids which can be employed are the monocarboxylic and polycarboxylic acids which can be aliphatic, aromatic, or cycloaliphatic in nature. Representative suitable acids include acetic, trichloroacetic, bromoacetic, citric, maleic, fumaric, itaconic, phenylacetic, benzene sulfonic and methane sulfonic acids. The second method for preparing the hydrogen form, which is preferred, involves first preparing an ammonium or other hydrogen ion precursor form by base exchange and then calcining to cause evolution of the ammonia leaving a hydrogen ion remaining on the zeolite. Calcining is carried out in air at 500° C for about 15 minutes to about 24 hours. Suitable compounds for preparing the hydrogen ion precursor form include ammonium compounds such as the chloride, bromide, iodide, bicarbonate, sulfate, citrate, borate, and palmitate. Still other ammonium compounds which can be employed include quaternary ammonium compounds such as tetramethylammonium hydroxide and trimethylammonium chloride.

The phosphorus-containing zeolite employed in the process of the present invention is prepared by reacting a zeolite as defined herein with a phosphorus-containing compound having a covalent or ionic constituent capable of reacting or exchanging with hydrogen ion and thereafter heating.

Any phosphorus-containing compound having a covalent or ionic constituent capable of reacting with hydrogen ion may be employed. Suitable phosphorus-containing compounds include derivatives of groups represented by $PX_3$, $RPX_2$, $R_2PX$, $R_3P$, $R_3P=O$, $RPO_2$, $RP(O)(OX)_2$, $R_2P(O)OX$, $RP(OX)_2$, $ROP(OX)_2$, and $(RO)_2POP(OR)_2$, where R is an alkyl or phenyl radical and X is hydrogen, R, or halide. These compounds include primary, $RPH_2$, secondary, $R_2PH$, and tertiary, $R_3P$, phosphines such as butyl phosphine; the tertiary phosphine oxides, $R_3PO$, such as tributylphosphine oxide; the primary, $RP(O)(OX)_2$, and secondary, $R_2P(O)OX$, phosphonic acids such as benzene phosphonic acid; the esters of the phosphonic acids such as diethyl phosphonate, $(RO)_2P(O)H$, dialkyl alkyl phosphonates, $(RO)_2P(O)R$, and alkyl dialkylphosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites; andn esters thereof such as the monopropyl ester, alkyl dialkylphosphinites, $(RO)PR_2$, and dialkyl alkylphosphonite, $(RO)_2PR$ esters. Examples of phosphite estes include trimethylphosphite, triethylphosphite, diisopropylphosphite, butylphosphite; and pyrophosphites such as tetraethylpyrophosphite. The alkyl groups in the mentioned compounds containn one to four carbon atoms.

Other suitable phosphorus-containing compounds include the phosphorus halides such as phosphorus trichloride, bromide, and iodide, alkyl phosphorodichloridites, $(RO)PCl_2$, dialkyl phosphorochloridites, $(RO)_2PX$, dialkylphosphinochloridites, $R_2PCl$, alkyl alkylphosphonochloridates, $(RO)(R)P(O)Cl$, and dialkyl phosphinochloridates, $R_2P(O)Cl$.

Preferred phosphorus-containing compounds include trimethylphosphite and phosphorus trichloride. In the trimethylphosphite, the covalent ionic constitutent capable of reaction with hydrogen ion is $[CH_3-O-]^-$. In the phosphorus trichloride, the covalent or ionic constituent capable of reacting with hydrogen ion is $[-Cl]^-$.

While we do not wish to be limited by the consequences of a theory, it is believed that the constituent of the phosphorus-containing compound capable of reacting with hydrogen ion reacts with the hydrogen of the original zeolite. Thus, with trimethylphosphite, it is believed that the hydrogen on the zeolite reacts with one of the $[CH_3-O-]^-$ ions of the trimethylphosphite to form $CH_3OH$ and is believed thereby to chemically bond the remainder of the trimethylphosphite molecule, namely, the

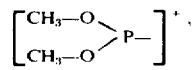

to the crystal structure of the zeolite possibly through a silanol group. In a similar manner, a phosphonate may undergo prototropic change in the manner

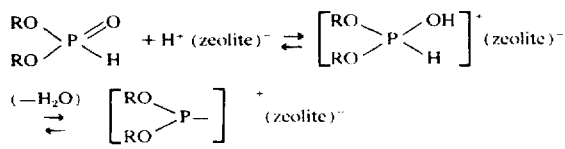

With phosphorus trichloride, it is believed that the hydrogen on the zeolite reacts with one of the [—Cl]⁻ ions of the phosphorus trichloride to form HCl and is believed thereby to chemically bond the remainder of the phosphorus trichloride molecule, namely, the [—PCl$_2$]$^+$, to the crystal structure of the zeolite possibly through a silanol group. These phosphorus-containing moieties, after the heating, in the presence of free oxygen, could be present as [PO$_2$]$^+$ or various phosphorus anhydride or hydroxyl forms. In any case, it is believed that the phosphorus is chemically bonded to the crystal structure of the zeolite since the phosphorus-containing zeolite can be used for extended periods of time at high temperatures without loss of phosphorus. Further reference will be made to this hereinafter. Further, the phosphorus is not likely present as a crystalline framework constituent, i.e., it has not been substituted for silicon or aluminum atoms, since the unit cell dimensions of the zeolite are unchanged on incorporation of phosphorus atoms with the zeolite. Further reference to this point will also be made hereinafter.

Incorporation of the phosphorus with the zeolite provides a composition having unique properties as a catalytic agent. For example, while the zeolites as defined herein are excellent aromatization catalysts, the phosphorus-containing zeolite does not possess such aromatizing activity. The ability of the zeolite to catalyze the transformation of aliphatic hydrocarbons to aromatic hydrocarbons in commercially desirable yields is not present with the phosphorus-containing zeolite. The zeolites possess strong acid sites and, while again we do not wish to be limited to the consequences of a theory, it is believed that the strong acid sites of the zeolites are responsible for their aromatizing activity. On the other hand, the phosphorus-containing zeolite does not possess these strong acid sites. Rather, the phosphorus-containing zeolite possesses a greater number of acid sites than the parent zeolite but these sites appear to have a lesser acid strength than those found in the parent zeolite. It is believed that the apparent replacement of the strong acid sites with a greater number of relatively weak acid sites may be responsible for the unique catalytic properties of the phosphorus-containing zeolite.

Reaction of the zeolite with the phosphorus-containing compound is effected by contacting the zeolite with the phosphorus-containing compound. Where the phosphorus-containing compound is a liquid, the phosphorus-containing compound can be in solution in a solvent at the time contact with the zeolite is effected. Any solvent relatively inert with respect to the phosphorus-containing compound and the zeolite may be employed. Suitable solvents include aliphatic, aromatic or alcoholic liquids. Where the phosphorus-containing compound is trimethylphosphite or liquid phosphorus trichloride, a hydrocarbon solvent such as n-octane may be employed. The phosphorus-containing compound may be used without a solvent, i.e., may be used as a neat liquid. Where the phosphorus-containing compound is in the gaseous phase, such as where gaseous phosphorus trichloride is employed, the phosphorus-containing compound can be used by itself or can be used in admixture with a gaseous diluent relatively inert to the phosphorus-containing compound and the zeolite such as air or nitrogen.

Preferably, prior to reacting the zeolite with the phosphorus-containing compound, the zeolite is dried. Drying can be effected in the presence of air. Elevated temperatures may be employed. However, the temperature should not be such, as mentioned hereinafter, that the crystal structure of the zeolite is destroyed.

Heating of the phosphorus-containing catalyst subsequent to preparation and prior to use is also preferred. The heating can be carried out in the presence of oxygen, for example air. Heating can be at a temperature of about 150°C. However, higher temperatures, i.e., up to about 500°C, are preferred. Heating can be carried out for 3-5 hours. It has been found that heating increases catalyst efficiency of the phosphorus-containing zeolite probably due to an increase in the number of acid sites rather than an increase in the strength of the existing acid sites. Increasing the heating temperature increases the catalyst efficiency. However, while heating temperatures above about 500°C can be employed, they are not necessary. At temperatures of about 1000°C, the crystal structure of the zeolite is destroyed.

The amount of phosphorus incorporated with the crystal structure of the phosphorus-containing zeolite should be at least about 0.78 percent by weight. With this amount of phosphorus, replacement of a sufficient proportion of the strong acid sites of the zeolite with an increased number of weak acid sites is effected. However, it is preferred in order to increase the replacement of the strong acid sites with an increased number of these weaker acid sites that the amount of phosphorus in the phosphorus-containing catalyst be at least about 2.5 percent by weight. The amount of phosphorus can be as high as about 4.5 percent by weight. The amount of phosphorus may be even higher than about 4.5 percent by weight although with these higher amounts a decline in catalytic activity can occur. By "percent by weight" we mean the unit weight of phosphorus per 100 unit weights of the zeolite. Amounts of phosphorus from about 0.78 to 4.5 percent by weight correspond to about 0.25 to 1.45 milliequivalents of phosphorus per gram of zeolite.

it was mentioned previously that the phosphorus is not likely present as a crystalline framework constituent of the phosphorus-containing zeolite. Evidence for this has been obtained by X-ray diffraction analysis of the zeolite before and after it has been modified by incorporation of phosphorus with the crystal structure to form the phosporus-containing zeolite. The interplanar spacings are substantially identical for the zeolite before and after phosphorus incorporation. On the other hand, the relative intensities of the 11.10 and 9.95 A d-spacings of the phosphorus-containing zeolite are phosphorus dependent, the relative intensities decreasing with phosphorus concentration in the phosphorus-containing zeolite. The relative intensities of the remaining d-spacings are unaffected by the presence of the phosphorus in the phosphorus-containing zeolite. Characterization of the phosphorus-containing zeolite with respect to the zeolite can, in fact, be made on the basis of the decrease in the 11.10 and the 9.95 A d-spacings as a result of the incorporation of the phosphorus with the zeolite.

The amount of phosphorus incorporated with the zeolite by reaction with the phsophorus-containing compound will depend upon several factors. One of these is the reaction time, i.e., the time that the zeolite and the phosphorus-containing compound are maintained in contact with each other. With greater reaction times, all other factors being equal, a greater amount of phosphorus is incorporated with the zeolite. Another factor is the ratio of the phsophorus-containing comound to the zeolite in the reaction mixture employed to effect incorporation of the phosphorus with the zeolite. With greater ratios of phosphorus-containing compound to zeolite, again all other factors being equal, a greater amount of phosphorus is incorporated with the zeolite. Other factors upon which the amount of phosphorus incorporated with the zeolite is dependent include reaction temperature, concentration of the phosphorus-containing compound in the reaction mixture, the degree to which the zeolite has been dried prior to reaction with the phosphorus-containing compound and the conditions of drying of the phosphorus-containing zeolite after reaction of the zeolite with the phosphorus-containing compound.

It has been found that the concentration of phosphorus-induced weak acid sites, and thus the catalytic activity, of the phosphorus-containing zeolite is altered upon contact with water vapor. Thus, upon contact with water vapor the number of weak acid sites appears to be increased. This increase may occur after the phosphorus-containing zeolite is put into use as a catalyst as a result of contact with water vapor contained in the feed to the catalyst or formed during the reaction of the feed with the catalyst. Preferably, however, in order to obtain the benefits of an initial increased catalytic activity of the phosphorus-containing zeolite, the phosphorus-containing zeolite is contacted with water vapor prior to its use as a catalyst. Further, it is preferred that this contact with water vapor be carried out subsequent to contact with the phosphorus-containing compound but prior to heating. Contact of the phosphorus-containing zeolite with the water vapor may be carried out in any suitable manner. For example, sorption of water vapor on the phosphorus-containing zeolite can be effected in a vacuum desiccator at ambient conditions for one hour. Water vapor can also be sorbed by passing an inert gas such as helium through a water bubbler and passing the entrained water vapor through the phosphorus-containing zeolite in a reactionn tube.

The phosphorus-containing zeolite may be modified by impregnating with zinc. Impregnation of the phsophorus containing zeolite with zinc significantly increases the activity of the phsophorus-containing zeolite as a catalyst for the conversion of the methanol or the dimethyl ether. In general, however, the product spectrum obtained with the phosphorus-cntaining zeolite impregnated with the zinc is similar to that obtained with the phosphorus-containing zeolite.

The phosphorus-containing zeolite may be impregnated with the zinc by contacting the zeolite with a solution of a zinc salt. For example, the phosphorus-containing zeolite may be contacted with a sufficient amount of a solution of a zinc salt to fill the pore volume of the phosphorus-containing zeolite, the concentration of the zinc salt in the solution being such that the phosphorus-containing zeolite, when its pore volume is filled with the solution, will be impregnated with the desired amount of zinc. If the zinc salt is not sufficiently soluble in the solvent such that the desired amount of zinc will be impregnated in the phosphorus-containing zeolite, the process may be repeated one or more times after removal of the solvent by drying following each contact with the solution. The solvent for the zinc salt is preferably water. However, any relatively inert solvent may be employed.

The zinc salt may be an organic salt or an inorganic salt. Organic salts of zinc that may be employed include the acetate, benzoate, butyrae, formate, lactate and others. Inorganic salts of zinc that may be employed include the bromide, chlorate, chloride, iodide, nitrate, sulfate, and others.

Following impregnation with the zinc salt, the phosphorus-containing zeolite is heated as described hereinabove. In this connection, where the phosphorus-containing zeolite is to be impregnated with zinc, the heating after impregnation with the zinc can substitute for the heating described hereinabove.

The amount of zinc impregnated into the phosphorus-containing zeolite may be as desired. Any finite amount will be effective. However, the amount should be at least about 1 percent by weight. On the other hand, amounts in excess of about 4 percent by weight will not ordinarily be necessary. These amounts are intended to mean the amount of zinc and do not include the anion of the salt.

With respect to the anion of the salt, heating of the phosphorus-containing zeolite following impregnation with the zinc salt or during use thereof as a catalyst may remove or destroy the anion leaving the zinc as the material impregnating the phosphorus-containing zeolite.

The following examples will be illustrative of the invention. In each of the examples the phosphorus-containing zeolite catalyst was prepared from ZSM-5 zeolite having at least a portion of the original cations associated therewith replaced by hydrogen ions. Further, in the tables where product selectivities are given, they have been normalized, even if not so stated, to provide a total of 100 percent.

EXAMPLE 1

This example will illustrate the conversion of methanol by the process of the invention.

ZSM-5 zeolite, in the amount of 33.5 grams, was dried at 500° C for 1 hour in nitrogen and cooled. The zeolite was then placed in a glass flask with 167.5 milliliters of normal octane and 13.2 milliliters of trimethylphosphite. This flask was fitted with a reflux condenser, a dry nitrogen purge line, and a thermometer. The end of the reflux condenser was fitted with a calcium chloride trap to protect the contents of the flask from moisture. The contents of the flask were refluxed gently overnight. After cooling, the liquid phase in theflask was filtered off and the remaining solids washed on a fritted funnel with 250 milliliters of methylene chloride followed by 250 milliliters of normal pentane. The zeolite was placed in a vacuum oven for 2 hours at 110° C, cooled, and stored in a desiccator. The phosphorus content of the zeolite was 4.51 weight percent. As a final step, the zeolite was placed in a reactor and heated at 200°–250° C in a stream of dry nitrogen.

Methanol in the gaseous phase was passed over the phosphorus-containing zeolite catalyst in the reactor. For each of the several runs, a different temperature was employed. Following each run, the products were collected and analyzed.

The results are given in Tables I and II. In Table I, the selectivities of the products in weight percent are given, normalized to provide a total of 100 percent. In Table II, the results for each run are given in terms of the weight percent of the products in the effluent stream from the reactor. The temperature, the weight per hour space velocity, the percent conversion and the material balance for each run are also given. In Table III, the weight percent of the products obtained with the phosphorus-containing zeolite in Run 2 are compared with those obtained employing, as a catalyst, the original hydrogen form of the ZSM-5 zeolite.

Referring to Table II, in Run 2 at 385° C, 85 percent of the methanol was converted. This is a selectivity to hydrocarbons of approximately 13 percent, to dimethyl ether of 51 percent, and to water of 36 percent. In Run 4 at 560° C, virtually all of the methanol and intermediate dimethyl ether was converted to hydrocarbon (approximately 45 percent) and water (approximately 54 percent). The maximum theoretical conversion to hydrocarbon is 43.8 percent and to water is 56.2 percent. Comparing the results of the use of the ZSM-5 zeolite (Table III) with the use of the phosphorus-containing zeolite in Run 2, the $C_2$–$C_4$ paraffins decreased from 39 to 5 percent and the aromatics decreased from 40 to 20 percent. On the other hand, the olefins increased from 1.57 percent to 39.4 percent. It will also be noted, still referring to Table I, that, at a temperature of 325° C, the selectivities to the $C_2$ and $C_3$ olefins were high compared to the selectivities to the $C_2$ and $C_3$ paraffins. At temperatures above 325° C, the selectivities to the $C_2$, $C_3$, and $C_4$ olefins were high compared to the selectivities to the $C_2$, $C_3$, and $C_4$ paraffins.

TABLE I

| Run No. | 1 | 2 | 3 | 4 | 5 |
|---|---|---|---|---|---|
| Product Selectivity, Wt. % | | | | | |
| Ethylene | 10.8 | 7.5 | 4.6 | 13.3 | 18.9 |
| Propylene | 25.8 | 28.0 | 39.3 | 37.3 | 36.3 |
| Butenes | 0 | 3.9 | 18.4 | 15.0 | 12.6 |
| Total $C_1$–$C_4$ olefins | 36.6 | 39.4 | 62.3 | 65.6 | 67.8 |
| Aromatics | 0 | 20.4 | 8.0 | 12.2 | 14.3 |
| $C_5^+$ Aliphatics | 0 | 35.1 | 25.4 | 16.4 | 5.1 |
| Hydrogen | 0 | 0 | 0 | .3 | .4 |
| Methane | 0 | .1 | .1 | 2.6 | 5.1 |
| Ethane | 4.1 | 0 | .1 | .3 | 4.1 |
| Propane | 18.8 | .7 | 1.5 | 1.3 | 1.1 |
| Butane | 40.5 | 4.3 | 2.6 | .9 | .7 |
| CO + $CO_2$ | 0 | 0 | 0 | .4 | 1.4 |
| Total | 100.0 | 100.0 | 100.0 | 100.0 | 100.0 |

TABLE II

| Run No. | 1 | 2 | 3 | 4 | 5 |
|---|---|---|---|---|---|
| Temp., ° C | 325 | 385 | 465 | 560 | 620 |
| WHSV | 3.4 | 3.8 | 3.9 | 3.2 | 3.5 |
| Products, Wt. % | | | | | |
| Aliphatics | | | | | |
| $H_2$ | | | | .124 | .162 |
| CO | | | | .203 | .607 |
| $CH_4$ | | .016 | .035 | 1.175 | 2.189 |
| $C_2H_6$ | .012 | .004 | .026 | .148 | 1.762 |
| $C_2H_4$ | .031 | .851 | 1.658 | 6.060 | 8.177 |
| $C_3H_8$ | .054 | .075 | .541 | .571 | .493 |
| $C_3H_6$ | .074 | 3.159 | 14.277 | 17.067 | 15.626 |
| i-$C_4H_{10}$ | .057 | .427 | .891 | .253 | .120 |
| n-$C_4H_{10}$ | .059 | .054 | .085 | .127 | .160 |
| $C_4H_8$ | | .441 | 5.004 | 5.422 | 4.676 |
| $C_4H_6$ | | .004 | 1.716 | 1.417 | .712 |
| $C_5$ | | .893 | 3.757 | 4.577 | 1.365 |
| $C_6$ | | .795 | 3.195 | 1.948 | .632 |
| $C_7^+$ | | 2.278 | 2.312 | 1.011 | .170 |
| O-Compounds | | | | | |
| MeOMe | 57.683 | 42.999 | 4.848 | .035 | .034 |
| MeOH | 18.285 | 14.935 | 5.780 | .359 | 2.479 |
| $H_2O$ | 23.745 | 30.775 | 52.947 | 53.935 | 54.518 |
| Aromatics | | | | | |
| Benzene | | .114 | .331 | .498 | .437 |
| Toluene | | .089 | .299 | 1.020 | 1.498 |
| Xylenes | | .673 | 1.169 | 2.755 | 2.861 |
| Ar$C_9$ | | .674 | .881 | 1.168 | 1.163 |
| Ar$C_{10}$ | | .743 | .248 | .126 | .160 |
| Conversion, Wt. % | 81.7 | 85.1 | 94.2 | 99.6 | 97.5 |
| Material Balance, Wt.% | 98.0 | 99.6 | 98.8 | 102.0 | 93.9 |

TABLE III

| CATALYST | ZSM-5 | Phosphorus-Containing Zeolite |
|---|---|---|
| Temp., °C | 370 | 385 |
| WHSV | 1.33 | 3.8 |
| Products, Wt. % | | |
| $C_2H_6$ | .44 | 0 |
| $C_2H_4$ | .45 | 7.5 |
| $C_3H_8$ | 13.58 | .7 |
| $C_3H_6$ | 1.09 | 28.0 |
| $C_4$, sat. | 24.94 | 4.2 |
| $C_4$, unsat. | .03 | 3.9 |
| $C_5$ | 11.07 | 7.9 |
| $C_6$ | 5.99 | 17.2 |
| $C_7^+$ | 1.21 | 10.2 |
| Aromatic | 40.46 | 20.4 |
| Other | | .1 |
| Material Balance, Wt. % | 100.02 | 97.1 |

EXAMPLE 2

This example will further illustrate the conversion of methanol by the process of the invention.

The phosphorus-containing zeolite employed as a catalyst in this example was prepared in a manner similar to that described for the catalyst in Example 1. Prior to use, however, the phosphorus-containing zeolite was heated at 500° C in a stream of air flowing at the rate of 100 milliliters per minute for a period of 16 hours. Analysis of the phosphorus-containing zeolite indicated a phosphorus content of 3.48 weight percent.

Methanol was passed over the catalyst in the form of a fixed bed at several temperatures and at a weight per hour space velocity of 3.1. The products were collected and analyzed. The results are given in Tables IV and V. Table IV gives the temperature of reaction and the selectivity to the hydrocarbon products in weight percent, normalized to give a total of 100 percent. The composition of the reactor effluent stream is given in weight percent in Table V.

It can be seen from Table IV that the light olefin (defined as ethylene, propylene, and butenes) selectivities ranged from 43–70 percent by weight. Propylene was the maor component at temperatures of 500°–700° C where high conversions to hydrocarbons were obtained. The proportion of ethylene increased from 3–18 percent at these higher temperatures. Butenes production was significant and tended to fall moderately from 20–14 percent at these higher temperatures. Also at higher temperatures, the higher aliphatic fraction defined as $C_5$ and higher was also significant, 34–10 percent, diminishing in a regular fashion with increases in temperature. The fraction was also highly olefinic in nature.

TABLE IV

| Run No. | 1 | 2 | 3 | 4 | 5 | 6 |
|---|---|---|---|---|---|---|
| Temp, °C | 300 | 350 | 400 | 500 | 600 | 700 |
| Product Selectivity, Wt. % | | | | | | |
| Ethylene | 36.6 | 38.9 | 35.0 | 3.4 | 10.6 | 18.4 |
| Propylene | 0 | 0 | 0 | 34.9 | 41.0 | 30.5 |
| Butenes | 37.6 | 4.3 | 5.2 | 19.5 | 18.8 | 14.3 |
| Total $C_1$–$C_4$ olefins | 74.2 | 43.2 | 40.2 | 57.8 | 70.4 | 63.2 |
| Aromatics | 0 | 0 | 0 | 4.4 | 4.2 | 6.8 |
| $C_5^+$ Aliphatics | 10.2 | 0 | 0 | 33.5 | 20.2 | 10.3 |
| Hydrogen | 0 | 0 | 0 | 0 | .1 | 1.3 |
| Methane | 0 | 0 | 9.7 | 1.5 | 2.9 | 10.5 |
| Ethane | 0 | 0 | 0 | .1 | .3 | 1.2 |
| Propane | 0 | 0 | 0 | .6 | .8 | .5 |
| Butane | 15.6 | 56.8 | 50.1 | 2.1 | .8 | .4 |
| $CO+CO_2$ | 0 | 0 | 0 | 0 | .3 | 5.8 |
| Total | 100.0 | 100.0 | 100.0 | 100.0 | 100.0 | 100.0 |

TABLE V

| Run No. | 1 | 2 | 3 | 4 | 5 | 6 |
|---|---|---|---|---|---|---|
| Temp., °C | 300 | 350 | 400 | 500 | 600 | 700 |
| Aliphatics, Wt. % | | | | | | |
| $H_2$ | | | | .002 | .040 | .563 |
| CO | | | | .013 | .067 | 2.326 |
| $CO_2$ | | | | 0 | .013 | .110 |
| $CH_4$ | | | .066 | .594 | 1.265 | 4.461 |
| $C_2H_6$ | | | 0 | .045 | .130 | .501 |
| $C_2H_4$ | .286 | .347 | .238 | 1.324 | 4.635 | 7.811 |
| $C_3H_8$ | 0 | 0 | 0 | .245 | .346 | .211 |
| $C_3H_6$ | | | 0 | 13.500 | 17.980 | 12.879 |
| i–$C_4H_{10}$ | .122 | .506 | .341 | .710 | .229 | .066 |
| n–$C_4H_{10}$ | | | 0 | .128 | .143 | .067 |
| $C_4H_8$ | .293 | .038 | .035 | 6.542 | 7.475 | 4.717 |
| $C_4H_6$ | | | 0 | 1.039 | .771 | 1.349 |
| $C_5$ | .080 | | | 5.254 | 5.613 | 3.358 |
| $C_6$ | | | | 5.217 | 2.385 | .902 |
| $C_7^+$ | | | | 2.492 | .930 | .146 |
| O-Compounds, Wt. % | | | | | | |
| MeOMe | 54.612 | 59.503 | 57.095 | 4.803 | .044 | .006 |
| MeOH | 23.073 | 15.959 | 18.304 | 5.527 | 1.377 | .571 |
| $H_2O$ | 21.533 | 23.746 | 23.920 | 50.885 | 54.756 | 57.069 |
| Aromatics, Wt. % | | | | | | |
| Benzene | | | | .308 | .379 | 1.382 |
| Toluene | | | | .266 | .426 | .971 |
| Xylenes | | | | .620 | .711 | .412 |
| $ArC_9$ | | | | .384 | .242 | .062 |
| $ArC_{10}$ | | | | .102 | .043 | .059 |
| Conversion, Wt. % | 76.9 | 84.0 | 81.7 | 94.5 | 98.6 | 99.4 |
| Material Balance, Wt. % | 100.0 | 102.6 | 97.4 | 95.5 | 95.7 | 93.3 |

EXAMPLE 3

This example will illustrate the conversion of dimethyl ether by the process of the invention.

The phosphorus-containing zeolite employed as catalyst in this example was prepared in a manner similar to that described in Example 1. The phosphorus content of the catalyst was 4.42 percent by weight. Dimethyl ether in the vapor phase was passed over the catalyst in the form of a fixed bed at a weight per hour space velocity of 2.4 and for each of the runs a different temperature was employed. Following each run, the products were analyzed.

The results are given in Tables VI and VII. In Table VI, the selectivities of the products in weight percent are given. In Table VII, the results for each run are given in terms of the weight percent of the components in the products.

It will be observed from Table VI that, at the temperatures of 300°, 350°, and 400° C, the selectivities to the $C_2$ and $C_3$ olefins were high compared to the selectivities of the $C_2$ and $C_3$ paraffins and at temperatures of 300° and 400° C, the selectivities to the $C_2$, $C_3$, and $C_4$ olefins were high compared to the selectivities of the $C_2$, $C_3$, and $C_4$ paraffins.

TABLE VI

| Run No. | 1 | 2 | 3 |
|---|---|---|---|
| Temp., °C | 300 | 350 | 400 |
| Conversion, Wt. % | 0.22 | 5.7 | 56.7 |
| Product Selectivity, Wt. % | | | |
| Ethylene | 40.2 | 18.1 | 4.4 |
| Propylene | 49.5 | 30.8 | 27.2 |
| Butenes | 10.3 | .9 | 13.4 |
| Total $C_2$–$C_4$ olefins | 100.0 | 49.8 | 45.0 |
| Aromatics | 0 | 10.0 | 8.7 |
| $C_5^+$ Aliphatics | 0 | 20.1 | 43.3 |
| Hydrogen | 0 | 0 | 0 |
| Methane | 0 | 3.4 | 1.1 |
| Ethane | 0 | .4 | .1 |
| Propane | 0 | .4 | .3 |
| Butane | 0 | 15.9 | 1.5 |
| CO+CO$_2$ | 0 | 0 | 0 |
| Total | 100.0 | 100.0 | 100.0 |

TABLE VII

| Run No. | 1 | 2 | 3 |
|---|---|---|---|
| Aliphatics, Wt. % | | | |
| CH$_4$ | | .101 | .347 |
| C$_2$H$_6$ | .090 | .011 | .044 |
| C$_2$H$_4$ | | .536 | 1.416 |
| C$_3$H$_8$ | | .013 | .104 |
| C$_3$H$_6$ | .111 | .909 | 8.633 |
| i–C$_4$H$_{10}$ | | .471 | .458 |
| n–C$_4$H$_{10}$ | | 0 | .046 |
| C$_4$H$_8$ | .023 | .028 | 3.634 |
| C$_4$H$_6$ | | 0 | .646 |
| C$_5$ | | .167 | 4.215 |
| C$_6$ | | .274 | 7.345 |
| C$_7^+$ | | .150 | 2.216 |
| O-Compounds, Wt. % | | | |
| MeOMe | 99.776 | 94.254 | 43.272 |
| MeOH | | 2.601 | 11.077 |
| H$_2$O | | .186 | 13.813 |
| Aromatics, Wt. % | | | |
| Benzene | | .036 | .533 |
| Toluene | | .013 | .335 |
| Xylenes | | .169 | .943 |
| ArC$_3$ | | .063 | .636 |
| ArC$_{10}$ | | .018 | .287 |
| Conversion, Wt. % | .22 | 5.7 | 56.7 |
| Material Balance, Wt. % | 98.6 | 98.7 | 101.7 |

EXAMPLE 4

This example will illustrate the conversion of dimethyl ether by the process of the invention.

The phosphorus-containing zeolite employed as the catalyst in this example was prepared by the general method described for Example 2. The zeolite in this case contained 3.77 percent of phosphorus by weight. Dimethyl ether in the gaseous phase was passed over a fixed bed of the catalyst in a reactor at several temperatures and a weight per hour space velocity of 14.5. The products were collected and analyzed. The results are given in Tables VIII and IX. Table VIII gives the hydrocarbon product selectivities in weight percent and Table IX gives the composition in weight percent of the effluent stream from the reactor.

TABLE VIII

| Run No. | 1 | 2 | 3 |
|---|---|---|---|
| Temp., °C | 300 | 350 | 400 |
| Product Selectivity, Wt. % | | | |
| Ethylene | 1.1 | 2.1 | 2.7 |
| Propylene | 38.7 | 32.3 | 22.6 |
| Butenes | 10.0 | 9.1 | 16.7 |
| Total $C_2$–$C_4$ olefins | 49.8 | 43.5 | 42.0 |
| Aromatics | 0 | 0 | 2.4 |
| $C_5^+$ Aliphatics | 50.1 | 56.3 | 53.8 |
| Hydrogen | 0 | 0 | 0 |
| Methane | 0 | .2 | 1.8 |
| Ethane | 0 | 0 | 0 |
| Propane | .1 | 0 | 0 |
| Butane | 0 | 0 | 0 |
| CO+CO$_2$ | 0 | 0 | 0 |
| Total | 100.0 | 100.0 | 100.0 |

TABLE IX

| Run No. | 1 | 2 | 3 |
|---|---|---|---|
| Temp., °C | 300 | 350 | 400 |
| Aliphatics, Wt. % | | | |
| CH$_4$ | | .003 | .099 |
| C$_2$H$_6$ | | 0 | 0 |
| C$_2$H$_4$ | .011 | .037 | .151 |
| C$_3$H$_8$ | .001 | 0 | 0 |
| C$_3$H$_6$ | .380 | .553 | 1.257 |
| i–C$_4$H$_{10}$ | 0 | 0 | 0 |
| n–C$_4$H$_{10}$ | 0 | 0 | 0 |
| C$_4$H$_8$ | .072 | .115 | .657 |
| C$_4$H$_6$ | .027 | .042 | .272 |
| C$_5$ | .492 | .967 | 2.386 |
| C$_6$ | 0 | 0 | .100 |
| C$_7^+$ | 0 | 0 | .504 |
| O-Compounds, Wt. % | | | |
| MeOMe | 98.028 | 96.219 | 88.632 |
| MeOH | .927 | 1.885 | 5.003 |
| H$_2$O | .063 | .178 | .802 |
| Conversion, Wt. % | 2.0 | 3.8 | 11.4 |
| Material Balance, Wt. % | 102.0 | 103.6 | 99.7 |

EXAMPLE 5

This example will further illustrate the conversion of dimethyl ether by the process of the invention.

The phosphorus-containing zeolite employed as catalyst in this example was prepared by the method described in Example 2. In this case, the zeolite contained 3.48 percent by weight of phosphorus. Dimethyl ether was passed over a fixed bed of the catalyst in a reactor at various temperatures and at weight per hour space velocity of 2.3. The products were collected and analyzed. The results are given in Tables X and XI. Table X giving the hydrocarbon product selectivities in weight percent and Table XI giving the composition in weight percent of the effluent stream from the reactor.

TABLE X

| Run No. | 1 | 2 | 3 | 4 | 5 | 6 |
|---|---|---|---|---|---|---|
| Temp., °C | 300 | 350 | 400 | 500 | 600 | 700 |
| Conversion, Wt. % | 3.6 | 21.8 | 62.5 | 100 | 100 | 100 |
| Product Selectivity, Wt. % | | | | | | |
| Ethylene | 10.7 | 7.2 | 5.2 | 2.6 | 15.1 | 4.8 |
| Propylene | 32.0 | 28.2 | 23.2 | 33.9 | 38.4 | 7.0 |
| Butenes | 11.8 | 15.1 | 18.1 | 21.2 | 19.9 | .9 |
| Total $C_1$–$C_4$ olefins | 54.5 | 50.5 | 46.5 | 57.7 | 73.4 | 12.7 |
| Aromatics | 12.9 | 15.6 | 11.9 | 3.6 | 6.6 | 4.6 |
| $C_5^+$ Aliphatics | 7.3 | 27.1 | 36.5 | 33.3 | 13.0 | 3.9 |
| Hydrogen | 0 | 0 | 0 | 0 | .1 | 3.8 |
| Methane | 0 | .4 | 1.7 | 2.6 | 3.5 | 32.4 |
| Ethane | 10.9 | 1.3 | .5 | .4 | .5 | .9 |
| Propane | 8.3 | 1.7 | .6 | .7 | 1.3 | 2 |
| Butane | 6.1 | 3.4 | 2.3 | 1.4 | 1.1 | .0 |
| $CO+CO_2$ | 0 | 0 | 0 | .2 | .5 | 41.5 |
| Total | 100.0 | 100.0 | 100.0 | 100.0 | 100.0 | 100.0 |

TABLE XI

| Run No. | 1 | 2 | 3 | 4 | 5 | 6 |
|---|---|---|---|---|---|---|
| Aliphatics, Wt. % | | | | | | |
| $H_2$ | | | | .004 | .065 | 3.088 |
| CO | | | .012 | .023 | .208 | 32.969 |
| $CO_2$ | | | 0 | .102 | .126 | .285 |
| $CH_4$ | | .041 | .553 | 1.577 | 2.093 | 25.886 |
| $C_2H_6$ | .254 | .134 | .163 | .249 | .331 | .745 |
| $C_2H_4$ | .248 | .763 | 1.719 | 1.596 | 9.143 | 3.825 |
| $C_3H_8$ | .193 | .184 | .200 | .423 | .771 | .136 |
| $C_3H_6$ | .745 | 3.006 | 7.678 | 20.699 | 23.193 | 5.655 |
| i–$C_4H_{10}$ | .072 | .253 | .678 | .679 | .375 | 0 |
| n–$C_4H_{10}$ | .069 | .109 | .093 | .211 | .313 | 0 |
| $C_4H_8$ | .275 | 1.438 | 5.018 | 10.864 | 11.039 | .574 |
| $C_4H_6$ | 0 | .167 | .959 | 2.081 | .999 | .164 |
| $C_5$ | .005 | .635 | 3.049 | 8.881 | 5.594 | 2.958 |
| $C_6$ | .010 | .588 | 3.530 | 7.799 | 1.411 | .141 |
| $C_7^+$ | .155 | 1.659 | 5.446 | 3.690 | .912 | .030 |
| O-Compounds, Wt. % | | | | | | |
| MeOMe | 96.352 | 78.242 | 37.532 | 0 | 0 | 0 |
| MeOH | 1.237 | 7.460 | 12.454 | .139 | .017 | .008 |
| $H_2O$ | .086 | 3.661 | 16.983 | 38.797 | 39.404 | 19.754 |
| Aromatics, Wt. % | | | | | | |
| Benzene | .008 | .108 | .354 | .414 | .564 | .334 |
| Toluene | .044 | .287 | .679 | .256 | .855 | .842 |
| Xylenes | .095 | .494 | 1.265 | .810 | 1.917 | 1.692 |
| $ArC_9$ | .065 | .405 | .874 | .530 | .585 | .665 |
| $ArC_{10}$ | .088 | .367 | .761 | .176 | .085 | .250 |
| Conversion, Wt. % | 3.6 | 21.8 | 62.5 | 100.0 | 100.0 | 100.0 |
| Material Balance, Wt. % | 102.4 | 101.5 | 101.0 | 98.4 | 96.4 | 92.5 |

EXAMPLE 6

This example will illustrate the conversion of dimethyl ether by the process of the invention where the phosphorus-containing zeolite is impregnated with zinc.

A phosphorus-containing zeolite was prepared by the general method described in Example 2. The amount of phosphorus in the zeolite was 4.5 percent by weight. An amount of zinc nitrae to give 1 percent by weight of zinc on the zeolite was dissolved in an appropriate amount of water to fill the pore volume of the zeolite. The zeolie was placed in the aqueous solution. After application of the solution, the zeolite was heated at 500° C for 1 hour in a stream of air at 100 milliliters per minute. Samples of this zeolite were employed as catalysts for the conversion of dimethyl ether. The dimethyl ether was passed in the gaseous phase at a weight per hour space velocity of 2.3 over the zeolite in the form of a fixed bed. For each of the four runs a different temperature was employed. Following each run, the products collected were analyzed.

The results are given in Tables XII and XIII. In Table XII, the selectivities of the hydrocarbon products in weight percent are given. In Table XIII, the weight percent of the products in the effluent streams are given.

It will be observed by comparison of Tables VII and XIII that, at temperatures of 300° C, 350° C, and 400° C, the conversions obtained with the zinc-impregnated phosphorus-containing zeolite were increased over those obtained with a phosphorus-containing zeolite without impregnation with zinc from 0.22 to 4.8 percent, 5.7 to 63.3 percent, and 56.7 to 87.2 percent, respectively.

TABLE XII

| Run No. | 1 | 2 | 3 | 4 |
|---|---|---|---|---|
| Temp., °C | 300 | 350 | 400 | 465 |
| Product Selectivity, Wt. % | | | | |
| Ethylene | 13.4 | 9.1 | 5.2 | 3.1 |
| Propylene | 43.7 | 29.1 | 25.6 | 31.5 |
| Butenes | 28.4 | 18.4 | 11.3 | 15.8 |
| Total $C_2$–$C_4$ olefins | 85.5 | 56.6 | 42.1 | 50.4 |
| Aromatics | 0 | 7.1 | 9.0 | 4.8 |
| $C_5^+$ Aliphatics | 8.6 | 31.0 | 45.5 | 40.5 |
| Hydrogen | 0 | 0 | 0 | 0 |
| Methane | 5.9 | .8 | .5 | .5 |
| Ethane | 0 | .3 | .1 | .2 |
| Propane | 0 | .6 | .7 | 1.3 |
| Butane | 0 | 3.6 | 2.1 | 2.3 |
| CO+$CO_2$ | 0 | 0 | 0 | 0 |
| Total | 100.0 | 100.0 | 100.0 | 100.0 |

TABLE XIII

| Run No. | 1 | 2 | 3 | 4 |
|---|---|---|---|---|
| Temp., °C | 300 | 350 | 400 | 465 |
| Products, Wt. % | | | | |
| Aliphatics | | | | |
| $H_2$ | 0 | 0 | 0 | 0 |
| CO | 0 | 0 | 0 | 0 |
| $CO_2$ | 0 | 0 | 0 | 0 |
| $CH_4$ | .12 | .4 | .25 | .32 |
| $C_2H_6$ | 0 | .14 | .06 | .12 |
| $C_2H_4$ | .27 | 4.9 | 2.8 | 1.9 |
| $C_3H_8$ | 0 | .33 | .4 | .8 |
| $C_3H_6$ | .9 | 15.4 | 13.9 | 19.7 |
| i–$C_4H_{10}$ | 0 | 1.9 | .07 | 1.4 |
| n–$C_4H_{10}$ | 0 | 0 | 1.1 | .05 |
| $C_4H_8$ | .56 | 7.6 | 4.7 | 7.3 |
| $C_4H_6$ | 0 | 2.2 | 1.4 | 2.6 |
| $C_5$ | .17 | 7.9 | 8.3 | 12.2 |
| $C_6$ | 0 | 5.4 | 12.4 | 11.0 |
| $C_7^+$ | 0 | 3.2 | 4.0 | 2.2 |
| O-Compounds | | | | |
| MeOMe | 95.2 | 36.7 | 12.8 | .03 |
| MeOH | 2.8 | 5.8 | 7.5 | 1.2 |
| $H_2O$ | 0 | 4.3 | 25.4 | 36.2 |
| Aromatics | | | | |
| Benzene | 0 | .09 | .6 | .6 |
| Toluene | 0 | .29 | .4 | .5 |
| Xylenes | 0 | 1.4 | 1.9 | 1.1 |
| $ArC_9$ | 0 | .9 | 1.1 | .7 |
| $ArC_{10}$ | 0 | 1.1 | .9 | .2 |
| Aliphatic, Wt. % | 2.0 | 49.4 | 49.4 | 59.5 |
| Aromatic, Wt. % | 0 | 3.8 | 4.9 | 3.0 |
| O-Compounds, Wt. % | 98.0 | 42.5 | 20.3 | 1.2 |
| $H_2O$, Wt. % | 0 | 4.3 | 25.4 | 36.2 |
| Conversion, Wt. % | 4.8 | 63.3 | 87.2 | 100 |
| Material Balance, Wt.% | 100.5 | 100.4 | 102.4 | 97.8 |

We claim:

1. A process for the conversion of methanol or dimethyl ether comprising contacting said methanol or dimethyl ether at a temperature of at least about 300° C with a catalyst comprising a crystalline aluminosilicate zeolite having a silica to alumina ratio of at least about 12, a constraint index of about 1 to 12, and containing phosphorus incorporated with the crystal structure thereof in an amount of at least about 0.78 percent by weight.

2. The process of claim 1 wherein methanol is contacted with said catalyst.

3. The process of claim 1 wherein dimethyl ether is contacted with said catalyst.

4. The process of claim 1 wherein said zeolite has a dried crystal density of not less than about 1.6 grams per cubic centimeter.

5. The process of claim 1 wherein said catalyst is impregnated with zinc.

6. The process of claim 5 wherein said catalyst is impregnated with zinc in the amount of 1 percent by weight.

7. The process of claim 1 wherein said catalyst contains said phosphorus in an amount of at least about 2.5 percent by weight.

8. The process of claim 1 wherein said catalyst contains said phosphorus in an amount between about 0.78 and 4.5 percent by weight.

9. The process of claim 1 wherein said methanol or said dimethyl ether is contacted with said catalyst at a temperature of at least about 350° C.

10. The process of claim 1 wherein said methanol or said dimethyl ether is contacted with said catalyst at a temperature of about 300° C to 700° C.

11. The process of claim 1 wherein said methanol or said dimethyl ether is in the vapor phase.

12. The process of claim 1 wherein said methanol or said dimethyl ether is contacted with said catalyst by passing said methanol or said dimethyl ether over a fixed bed of said catalyst.

13. The process of claim 1 wherein said methanol or said dimethyl ether is passed over said bed of catalyst at a weight per hour space velocity of about 1.5 to 14.5.

14. The process of claim 1 wherein said catalyst is ZSM-5 containing phosphorus incorporated with the crystal structure thereof in an amount of at least about 0.78 percent by weight.

15. The process of claim 1 wherein aid catalyst is ZSM-11 containing phosphorus incorporated with the crystal structure thereof in an amount of at least about 0.78 percent by weight.

16. The process of claim 1 wherein said catalyst is ZSM-12 containing phosphorus incorporated with the crystal structure thereof in an amount of at least about 0.78 percent by weight.

17. The process of claim 1 wherein said catalyst is ZSM-21 containing phosphorus incorporated with the crystal structure thereof in an amount of at least about 0.78 percent by weight.

18. The process of claim 1 wherein said catalyst is TEA mordenite containing phosphorus incorporated with the crystal structure thereof in an amount of at least about 0.78 percent by weight.

19. A process for the conversion of methanol or dimethyl ether comprising contacting said methanol or dimethyl ether at a temperature of about 300°C to 700°C with a catalyst comprising a crystalline aluminosilicate having a silica to alumina ratio of at least about 12, a constraint index of about 1 to 12, a dried crystal density of not less than about 1.6 grams per cubic centimeter, and containing phosphorus incorporated with the crystal structure thereof in an amount of about 0.78 to 4.5 percent by weight, by passing said methanol or said dimethyl ether over a fixed bed of said catalyst.

20. The process of claim 19 wherein said methanol or said dimethyl ether is passed over said bed of catalyst at a weight per hour space velocity of about 1.5 to 14.5.

* * * * *

UNITED STATES PATENT AND TRADEMARK OFFICE
CERTIFICATE OF CORRECTION

PATENT NO. : 3,911,041
DATED : October 7, 1975
INVENTOR(S) : Warren W. Kaeding and Stephen A. Butter It is certified that error appears in the above-identified patent and that said Letters Patent are hereby corrected as shown below:

| | |
|---|---|
| Col. 1, line 27 | "incorporaed" should be --incorporated-- |
| Col. 2, line 8 | "37 selectivity" should be --"selectivity"-- |
| Col. 3, line 3 | "interacrystalline" should be --intracrystalline-- |
| Col. 3, line 12 | "breifly" should be --briefly-- |
| Col. 3, line 38 | "greaer" should be --greater-- |
| Col. 6, line 30 | "andn" should be --and-- |
| Col. 6, line 33 | "estes" should be --esters-- |
| Col. 6, line 37 | "containn" should be --contain-- |
| Col. 8, line 53 | "it was mentioned" should be --It was mentioned-- |
| Col. 9, line 8 | "phsophorus-containing" should be --phosphorus containing-- |
| Col. 9, line 15 | "comound to" should be --compound to-- |
| Col. 9, line 55 | "reactionn" should be --reaction-- |
| Col. 9, line 58 | "phsophorus" should be --phosphorus-- |
| Col. 9, line 63 | "cntaining" should be --containing-- |
| Col. 10, line 62 | "in theflask" should be --in the flask-- |
| Col. 14, line 16 | "maor" should be --major-- |
| Col. 14, Table V | Under Run No. 2, on line beginning MeOMe, "59.503" should be --59.403-- |
| Col. 17, Table X | "Total $C_1$- $C_1$ olefins" should be --Total $C_1$-$C_4$ olefins-- |
| Col. 17, line 58 | "nitrae" should be --nitrate-- |
| Col. 17, line 61 | "zeolie" should be --zeolite-- |

Signed and Sealed this eighteenth Day of May 1976

[SEAL]

Attest:

RUTH C. MASON
Attesting Officer

C. MARSHALL DANN
Commissioner of Patents and Trademarks